(12) United States Patent
Mizoguchi

(10) Patent No.: US 12,119,686 B2
(45) Date of Patent: Oct. 15, 2024

(54) POWER SOURCE SYSTEM

(71) Applicant: DENSO CORPORATION, Kariya (JP)

(72) Inventor: Tomomichi Mizoguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 714 days.

(21) Appl. No.: 17/383,621

(22) Filed: Jul. 23, 2021

(65) Prior Publication Data

US 2021/0351604 A1 Nov. 11, 2021

Related U.S. Application Data

(63) Continuation of application No. PCT/JP2020/001103, filed on Jan. 15, 2020.

(30) Foreign Application Priority Data

Jan. 23, 2019 (JP) .................................. 2019-009761

(51) Int. Cl.
*H02J 7/00* (2006.01)

(52) U.S. Cl.
CPC ........ *H02J 7/00306* (2020.01); *H02J 7/0047* (2013.01); *H02J 7/007182* (2020.01); *H01M 2220/10* (2013.01); *H01M 2220/20* (2013.01); *H01M 2220/30* (2013.01); *H02J 7/0013* (2013.01)

(58) Field of Classification Search
CPC ............. H02J 7/00306; H02J 7/007182; H02J 7/0047; H02J 7/0013; H01M 2220/10; H01M 2220/20; H01M 2220/30
USPC .......... 326/136, 128, 163, 112, 114, 117, 109
See application file for complete search history.

(56) References Cited

U.S. PATENT DOCUMENTS

| | | | | |
|---|---|---|---|---|
| 5,079,686 A | * | 1/1992 | Vinciarelli | H02J 1/102 363/95 |
| 5,229,650 A | * | 7/1993 | Kita | H02J 9/062 307/64 |
| 9,233,612 B2 | * | 1/2016 | Kumar | B60L 9/02 |
| 10,361,467 B2 | * | 7/2019 | Kubo | H02J 7/0029 |

(Continued)

FOREIGN PATENT DOCUMENTS

| | | |
|---|---|---|
| JP | 2017-093226 A | 5/2017 |
| JP | 2018-098949 A | 6/2018 |
| JP | 2018-139483 A | 9/2018 |

OTHER PUBLICATIONS

Feb. 18, 2020 International Search Report issued in International Patent Application No. PCT/JP2020/001103.

*Primary Examiner* — Phallaka Kik
(74) *Attorney, Agent, or Firm* — Oliff PLC

(57) ABSTRACT

Provided is a power source system including: a storage battery; a control unit operating by being supplied with power from the storage battery and monitoring the storage battery; a first switch configured as a latch type switch disposed on a first electrical path between the storage battery and the control unit; and a second switch configured as a latch type switch disposed on a second electrical path between the storage battery and an electrical equipment as an object to which the storage battery supplies power. The first switch and the second switch are connected in parallel to the control unit; current is supplied to the control unit from the storage battery; and the control unit includes a switch control unit configured to stop a current supply to the control unit from the storage battery.

7 Claims, 6 Drawing Sheets

(56) References Cited

U.S. PATENT DOCUMENTS

| | | | | |
|---|---|---|---|---|
| 10,984,997 | B2* | 4/2021 | Aoki | H01J 49/40 |
| 11,977,117 | B2* | 5/2024 | Johnson | G01R 31/3278 |
| 2008/0012534 | A1* | 1/2008 | Bucur | H01M 10/48 |
| | | | | 320/136 |
| 2008/0129119 | A1* | 6/2008 | Tonicello | H02J 7/35 |
| | | | | 320/101 |
| 2009/0234531 | A1* | 9/2009 | Sayama | H02J 9/061 |
| | | | | 701/31.7 |
| 2013/0229742 | A1* | 9/2013 | Auguet | B60L 3/0046 |
| | | | | 361/114 |
| 2014/0265604 | A1* | 9/2014 | Mergener | H02J 7/0025 |
| | | | | 307/80 |
| 2017/0310138 | A1* | 10/2017 | Masaoka | H02J 7/34 |
| 2018/0076635 | A1* | 3/2018 | Maalouf | H02J 7/02 |
| 2019/0044110 | A1* | 2/2019 | Sheeks | H01M 50/204 |
| 2019/0225092 | A1* | 7/2019 | Li | B60L 58/18 |
| 2019/0237995 | A1* | 8/2019 | Akita | H02J 7/02 |
| 2019/0252564 | A1* | 8/2019 | Farshchi | H01M 10/0565 |
| 2019/0252908 | A1* | 8/2019 | Takita | H02H 7/00 |
| 2019/0366831 | A1* | 12/2019 | Cafeo | H02J 7/0013 |
| 2019/0393696 | A1* | 12/2019 | Tada | H01M 50/583 |
| 2020/0076208 | A1* | 3/2020 | Williams | H02J 7/34 |
| 2020/0235440 | A1* | 7/2020 | Hao | H01M 10/441 |
| 2020/0298722 | A1* | 9/2020 | Smolenaers | H02J 7/345 |
| 2021/0305832 | A1* | 9/2021 | Kawamoto | H02J 7/007182 |
| 2022/0407307 | A1* | 12/2022 | Putnam | B60L 50/64 |

* cited by examiner

POWER SOURCE SYSTEM

CROSS REFERENCE TO RELATED APPLICATION

This application is the U.S. bypass application of International Application No. PCT/JP2020/001103 filed on Jan. 15, 2020, which designated the U.S. and claims priority to Japanese Patent Application No. 2019-009761, filed on Jan. 23, 2019, the contents of both of these are incorporated herein by reference.

BACKGROUND

Technical Field

The present disclosure relates to a power source system.

Description of the Related Art

Conventionally, a power source system provided with a storage battery that supplies power to electrical equipment such as a power steering apparatus and an air conditioning apparatus is known. According to this power source system, a control apparatus that monitors the storage battery is provided. The control apparatus operates by supplying power from the storage batter, and a dark current is supplied to the control apparatus from the storage battery while the power source system is suspended, for example, while the vehicle is parked.

SUMMARY

The present disclosure provides a power source system capable of continuously monitoring the storage battery and suppressing complexity of the configuration of the power source system.

A first aspect of the present disclosure is a power source system including: a storage battery; a control unit operating by being supplied with power from the storage battery and monitoring the storage battery; a first switch configured as a latch type switch disposed on a first electrical path between the storage battery and the control unit; and a second switch configured as a latch type switch disposed on a second electrical path between the storage battery and an electrical equipment as an object to which the storage battery supplies power.

BRIEF DESCRIPTION OF THE DRAWINGS

The foregoing and other objects, features, and advantages of the present disclosure will be more clarified by the following detailed descriptions with reference to the accompanying drawings.

In the accompanying drawings.

DETAILED DESCRIPTION OF THE PREFERRED EMBODIMENTS

Conventionally, a power source system provided with a storage battery that supplies power to electrical equipment such as a power steering apparatus and an air conditioning apparatus is known. For example, JP-A-2017-93226 discloses a power source system provided with a control apparatus that monitors the storage battery. According to this power source system, the control apparatus operates by supplying power from the storage batter, and a dark current is supplied to the control apparatus from the storage battery while the power source system is suspended, for example, while the vehicle is parked. In the power source system, a latch relay is provided on an electrical conduction path which connects between the storage battery and the control apparatus. The control apparatus holds the latch relay in a closed state while the power source system is suspended, and the control apparatus itself switches a control side lath relay to be in an opened state when the voltage of the storage battery is decreased when the vehicle is left parked for a long term period.

However, in the case where a state of the latch relay is accidentally switched to the opened state due to noise or the like, the dark current supply to the control apparatus from the storage battery is stopped, and thereafter, the storage battery cannot be monitored. In order to continue monitoring the storage battery even when the state of the latch relay is accidentally switched to the opened state, the configuration of the power source system becomes more complex causing high manufacturing cost and increase in size of the system. Accordingly, a technique is desired in which the storage battery can be continuously monitored and the configuration of the power source system can be suppressed from becoming complex, even when the latch relay is accidentally switched to the opened state.

With reference to the drawings, embodiments of the present disclosure will be described.

First Embodiment

Hereinafter, a first embodiment in which a power source system according to the first embodiment is embodied will be described with reference to the drawings. A power source system 100 according to the present embodiment will be mounted on an electric vehicle having a rotary electric machine, for example, a hybrid vehicle.

Figure 1:
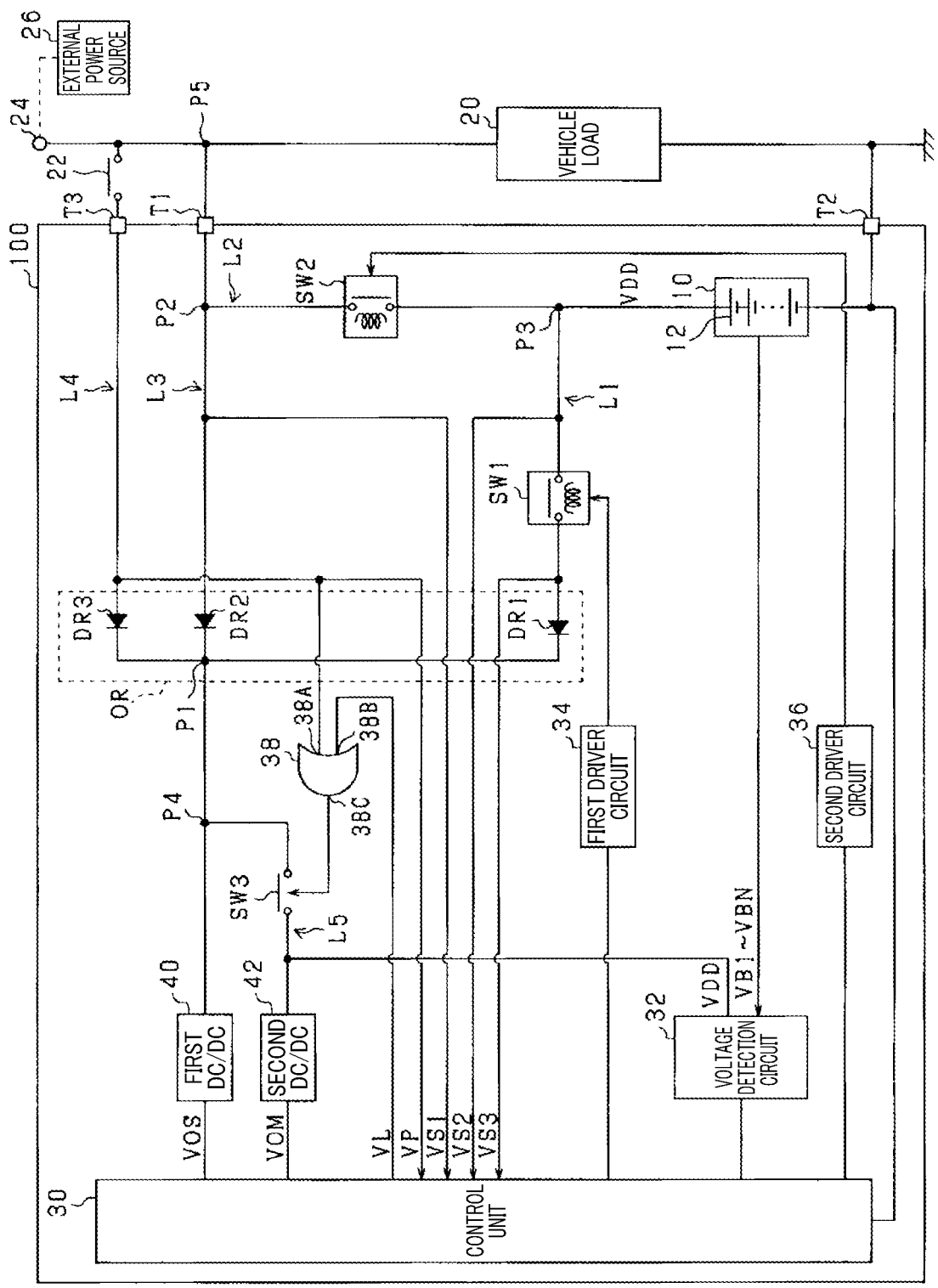
FIG. 1 is a block diagram showing an overall configuration of a power source system according to a first embodiment.

As shown in FIG. 1, a power source system 100 is provided with a DC power source 10, a control unit 30, a first switch SW1, and a second switch SW2. The DC power source 10 is a storage battery capable of being charged or discharged and configured to include a plurality of battery cells 12 connected in series. As the battery cells 12, a lithium-ion battery or a nickel hydride battery can be used.

The first switch SW1 and the second switch SW2 are each configured as latch type switch which allows excitation current to flow only when switching between a closed (ON) state and an opened (OFF) state. The first switch SW1 is disposed on a first electrical path L1 between the DC power source 10 and the control unit 30. Specifically, the first electrical path L1 connects between the positive terminal of the DC power source 10 and the power source terminal of the control unit 30, and the first switch SW1 is disposed on the first electrical path L1.

The second switch SW2 is disposed on a second electrical path L2 between the DC power source 10 and a first terminal T1 of the power source system 100. Specifically, the second electrical path L2 is branched from the first electrical path L1 at a third connection point P3 between the DC power source 10 and the first switch SW1 on the first electrical path L1. The second switch SW2 is disposed on the second electrical path L2 between the third connection point P3 and the first terminal T1.

A first connection point P1 between the first switch SW1 and the control unit 30 on the first electrical path L1 is connected to a third terminal T3 of the power source system 100. A third diode DR3 as a third rectifying element is disposed at a fourth electrical path L4 between the third terminal T3 and the first connection point P1. The third diode DR3 is disposed such that the forward direction thereof is a direction towards the first connection point P1 from an activation switch 22. Thus, in the case where an external power source 25 external to the power source system 100 is connected to the third terminal T3, power is supplied to the control unit 30 from the external power source 26 via the fourth electrical path L4.

A first diode DR1 as a first rectifying element is disposed between the first switch SW1 and the first connection point P1 on the first electrical path L1. The first diode DR1 is disposed such that the forward direction thereof is a direction towards the first connection point P1 from the first switch SW1. Thus, power is supplied to the control unit 30 from the DC power source 10 via the first electrical path L1.

Next, the control unit 30 will be described. The control unit 30 operates by being supplied with power from the DC power source. The control unit 30 is mainly configured as a microcomputer including a CPU, a ROM, a RAM and the like, and configured to monitor the DC power source 10 by executing various control programs stored in the ROM. Specifically, the control unit 30 is connected to a first DC/DC converter 40, a second DC/DC converter 42, a third switch SW3, a logical OR circuit 38, a voltage detection circuit 32, a first driver circuit 34 and a second driver circuit 36, and monitors the DC power source by using these units.

The first DC/C converter 40 is disposed between a first connection point P1 on a first electrical path L1 and a control unit 30. The first DC/DC converter 40 converts a power source voltage VDD of the DC power source 10 into a backup voltage VOS necessary for a backup operation of the control unit 30. The backup voltage VOS is always inputted to the control unit 30 excluding a system stopped state of the power source system 100 where the power supply (current supply) from the DC power source 10 to the control unit 30 is stopped.

A fourth connection point P4 between the first connection point P1 and the DC/DC converter 40 on the first electrical path L1 is connected to the control unit 30 via a fifth electrical path L5 different from the first electrical path L1. A second DC/DC converter 42 is disposed between the fourth connection point P4 and the control unit 30 on the fifth electrical path L5. The DC/DC converter 42 converts the power source voltage VDD of the DC power source into an operation voltage VOM required for operating the control unit 30 and outputs the converted voltage to the control unit 30.

A third switch SW3 is disposed between the fourth connection point P4 and the second DC/DC converter 42 on the fifth electrical path L5. The third switch SW3 is connected to an output terminal 38C of a logical OR circuit 38 and switched between ON and OFF by a switching signal outputted by the logical OR circuit 38.

Specifically, the first input terminal 38A is connected to a portion between the third terminal T3 and the third diode DR3 on the fourth electrical path L4, and receives the specified voltage VP which is a voltage between the third terminal T3 and the third diode DR3 on the fourth electrical path L4. Moreover, the input terminal 38B of the logical OR circuit 38 is connected to a signal output terminal of the control unit 30 and receives an activation voltage VL from the control unit 30. The logical OR circuit 38 outputs a switching signal of logical H to the third switch SW3 when at least one of the specified voltage VP and the activation voltage VL is logical H which is larger than a predetermined value Vn. Thus, the third switch SW3 is switched to the ON state and the control unit 30 receives the operation voltage VOM.

In the case where both the specified voltage VP and the activation voltage VL are logical L which is smaller than the predetermined value Vn, the logical OR circuit 38 outputs a switching signal of logical L to the third switch SW3. Thus, the third switch SW3 is switched to the OFF state and the operation voltage VOM is no longer transmitted to the control unit 30.

The voltage detection circuit 32 is connected to a portion between the third switch SW3 and the second DC/DC converter 42 on the fifth electrical pat L5, and operates with the power source voltage VDD of the DC power source 10 which is applied to the fifth electrical path L5. The voltage detection circuit 32 detects, in accordance with a command from the control unit 30, cell voltages VB1 to VBN (N is 2 or more and is an integer number) of respective battery cells 12 of the DC power source 10. The control unit 30 uses the cell voltages VB1 to VBN acquired from the voltage detection circuit 32 to calculate a state of charge (SOC) of each battery cell 12. Note that the cell voltage VB1 to VBN correspond to battery voltage according to a present embodiment.

The first driver circuit 34 is connected to the first switch SW1 and outputs an excitation current in response to the command transmitted from the control unit 30 to the first switch SW1 to be opened or closed, thereby switching the first switch SW1 between ON state and OFF state. Further, the second driver circuit 36 is connected to the second switch SW2 and outputs an excitation current in response to the command transmitted from the control unit 30 to the second switch SW2 to be opened or closed, thereby switching the second switch SW2 between ON state and OFF state. According to the present embodiment, the excitation current corresponds to a latch command signal.

Next, a connection between the power source system 100 and external configuration outside the power source system will be described. The power source system 100 is connected to a vehicle load 20 as an external configuration and an external connection terminal 24. The vehicle load 20 is an object to be supplied with a power by the DC power source 10, and includes a rotary electric machine. The vehicle load 20 is connected to the first terminal T1 of the power source system 100. Specifically, the vehicle load 20 is connected to the second electrical path L2 extending outside the power source system 100 via the first terminal T1. Hence, the second switch SW2 is disposed on the second electrical path L2 between the DC power source 10 and the vehicle load 20. The negative terminal of the DC power source 10, the control unit 30 and the vehicle load 20 are mutually connected via the second terminal T2 of the power source system 100 and connected to the ground. Note that the vehicle load 20 corresponds to electrical equipment.

The external connection terminal 24 connects the external power source 26. The external power source 24 is connected to the third terminal T3 of the power source system 100. Specifically, the external connection terminal 24 is connected to the fourth electrical path L4 extending outside the power source system 100 via the third terminal T3. The activation switch 22 is disposed on the fourth electrical path L4 between the external connection terminal 24 and the third terminal T3.

The activation switch 22 serves as, for example, an ignition switch (i.e. IG switch) of the vehicle, which is switched between ON state and OFF state the user of the vehicle. The external power source 26 is a DC power source mounted on a rescue vehicle other than the vehicle in which the power source system 100 is mounted, and connected to the external connection terminal by the user or the like of the vehicle. According to the power source system 100, when the switch SW1 and the switch SW2 are ON state, that is, in a system stopped state where the power supply from the DC power source 10 to the control unit 30 is stopped, an activation of the control unit 30, that is, a jump-start can be accomplished by the power supplied by the external power source 26 to be connected to the external connection terminal.

The external connection terminal 24 is connected to the fifth connection point P5 on the second electrical path L2 between the first terminal T1 and the vehicle load 20. Thus, in the case where the control unit 30 is activated as a jump-start, the power can be supplied to the DC power source 10 from the external power source 26.

When the vehicle is running, the power source system 100 is in a system activation state in which the switches SW1 to SW3 are maintained ON state, and when the vehicle is parked, the state of the power source system 100 is changed to a system suspended state. In the system suspended state, the switched SW1 and the SW2 are maintained at ON state and the third switch SW3 is maintained at an opened state. Thus, the power consumption of the control unit 30 can be suppressed. Further, in the system suspended state, the activation voltage VL is intermittently switched to logical H at every one hour, for example, whereby the third switch SW3 is switched to the ON state. As a result, during the system stopped state, the control unit 30 is activated in a predetermined period. In an intermittent activation period of the system suspended state, an equalization process is performed for charging states of respective battery cells 12.

In other words, in the system activation state and the system suspended state, the control unit 30 continues to monitor the DC power source 10 and the current is supplied to the control unit 30 from the DC power source 10. However, according to a conventional power source system, an electrical path for supplying power (current) to the control unit 30 from the DC power source 10 is only the first electrical path L1. Hence, in the case where the first switch SW1 is erroneously switched to the OFF state due to noise or the like, that is, so-called false latch occurs, the power supply to the control unit 30 from the DC power source 10 is stopped and thereafter, monitoring of the DC power source 10 cannot be continued.

According to the power source system 100 of the present embodiment, the first switch SW1 and the second switch SW2 are connected in parallel to the control unit 30. Specifically, the first connection point P1 on the first electrical path L1 is connected to a portion between the second switch SW1 and the vehicle load 20 on the second electrical path L2, that is, the first connection point P1 is connected to the second connection point P2 between the second switch SW2 and the first terminal T1.

A second diode DR2 as a second rectifying element is disposed on the third electrical path between the first connection point P1 and the second connection point P2. In other words, in the first electrical path L1, the second electrical path L3 and the fourth electrical path L4, a logical OR circuit OR is formed by the diodes DR1 to DR3 for the power supply to the control unit 30. The second diode DR2 is disposed such that the forward direction thereof is a direction towards the first connection point P1 from the second connection point P2. Thus, the power supply to the control unit 30 from the DC power source 10 is accomplished via the second electrical path L2 and the third electrical path L3.

The third electrical path L3 is connected to the external connection terminal 24 via the fifth connection point P5 on the second electrical path L2. Hence, the control unit 30 is connected to the external connection terminal 24 via the third electrical path L3.

According to the above-described configuration, by controlling the first switch SW1 and the second switch SW2 to be ON state, the power is supplied to the control unit 30 from the DC power source 10. Accordingly, even in the case where noise or the like causes a false latch phenomenon, since the second switch SW2 is turned ON, current can be supplied to the control unit 30 from the DC power source 10 via the second electrical path L2 and the third electrical path L3. Thus, the DC power source 10 can be continuously monitored without stopping the current supply to the control unit 30. Moreover, in the case where the voltage of the DC power source 10 drops because the vehicle is left parked for a long term period for example, the control unit 30 switches the first switch SW1 and the second switch SW2 to OFF states to stop the current supply to the control unit 30 from the DC power source 10. Thus, the DC power source can be prevented from being over-discharged. Further, the second switch SW2 disposed on the second electrical path L2 for the vehicle load 20 is connected in parallel to the first switch SW1 with respect to the control unit 30, whereby the current path to the control unit 30, that is, redundant configuration of the first switch 1 is accomplished. Therefore, the configuration of the power source system 100 can be prevented from becoming more complex.

The control unit 30 detects the specified voltage VP of the fourth electrical path L4. The control unit 30 detects a first determination voltage VS1 as a voltage between the second connection point P2 and the second diode DR2 on the third electrical path L3, that is, a voltage of an opposite side of the DC power source 10 (anti DC power source side) between both end voltages of the second switch SW2. Further, the control unit 30 detects a second determination voltage VS2 as a voltage between the DC power source 10 and the first switch SW1 on the first electrical path L1, that is, a voltage of the DC power source side between both end voltages of the first switch SW1. Furthermore, the control unit 30 detects a third determination voltage VS3 as a voltage between the first switch SW1 and the first diode DR1 on the first electrical path L1, that is, a voltage of the anti DC power source side between both end voltages of the first switch SW1. The control unit 30 performs, based on these detected voltages, a switch control process for switching the opening/closing states of the first switch SW1 and the second switch SW2.

Figure 2:
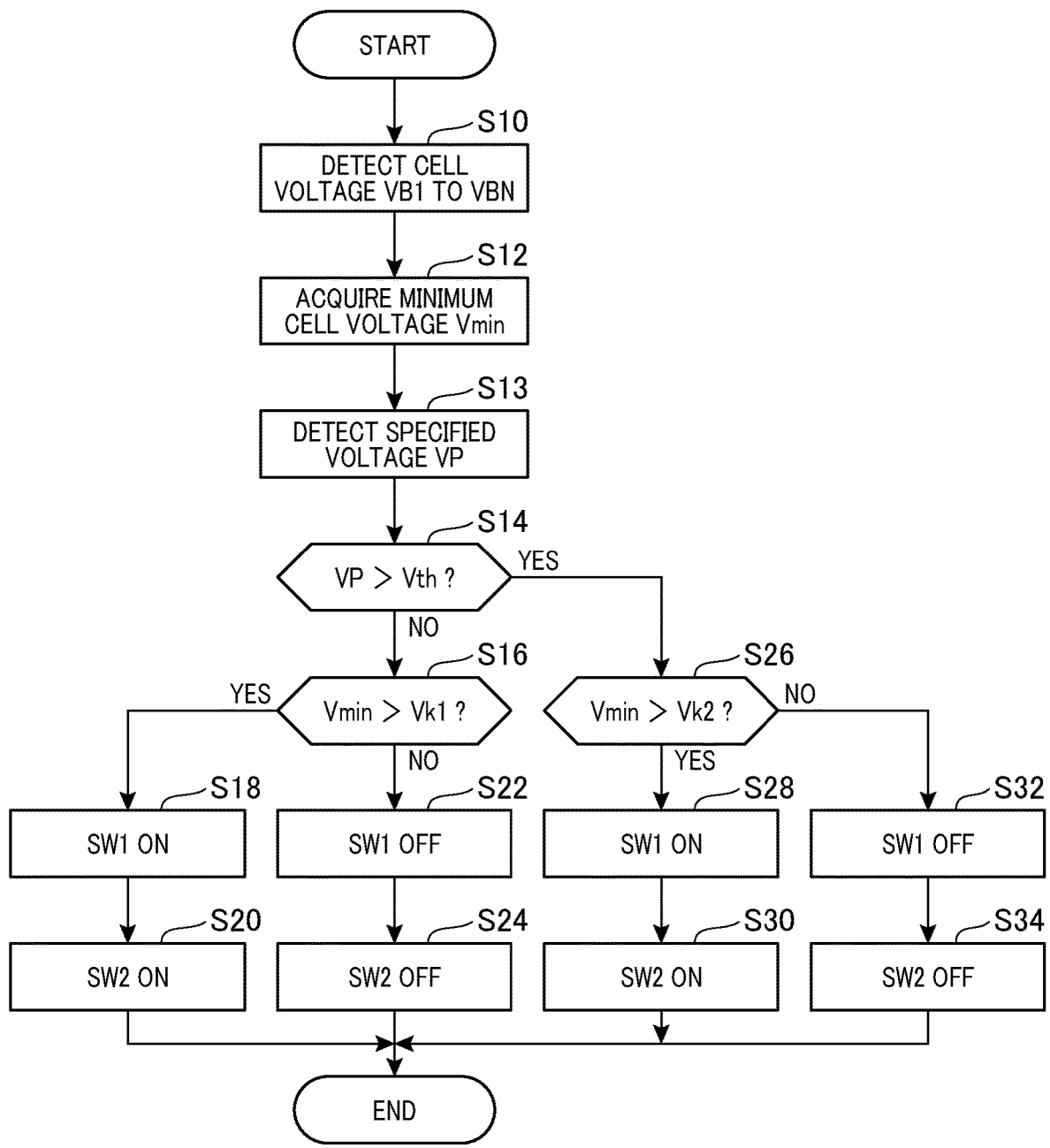
FIG. 2 is a flowchart showing a switch control process according to the first embodiment.

FIG. 2 shows a flowchart of the switch control process according to the present embodiment. The control unit 30 repeatedly performs the switch control process in the system activation state, a state of intermittent activation during the system suspended state, and a state of jump-start in the system stopped state.

When starting the switch control process, at step S10, the process detects the cell voltages VB1 to VBN by using the voltage detection circuit 32. At subsequent step S12, the process acquires the minimum cell voltage Vmin which is the smallest voltage value among the cell voltages VB1 to VBN detected at step S10. Note that the cell voltages VB1 to VBN of respective battery cells 12 are correlated with charging states of the respective battery cells 12. Hence, the minimum cell voltage Vmin indicates a charging state of a battery cell 12 having the lowest charging capacity among the respective battery cells 12. In the present embodiment, process at steps S10 and S12 correspond to voltage acquiring unit.

At subsequent step S13, the process detects specified voltage VP. At step S14, the process determines whether the specified voltage VP detected at step S13 is larger than a threshold Vth. The predetermined threshold Vth is a voltage value for determining whether the specified voltage VP is approximately 0 volts, for example, 0.5 volts.

In the case where it is in the system activation state or the intermittent activation period in the system suspended state, since the specified voltage VP is lower than the threshold Vth, the process determines as negative at step S14. In this case, at subsequent step S16, the process determines whether the minimum cell voltage Vmin acquired at step S12 is larger than the first threshold Vk1. According to the present embodiment, the first threshold Vk1 and the second threshold Vk2 are defined for monitoring an over-discharging state of the DC power source 10. Among these, the second threshold Vk2 is used as a determination threshold for determining whether the battery cell 12 is in the overcharging state, and the first threshold Vk1 has a higher voltage value than the second threshold Vk2 and used as a determination threshold for preventing the battery cell 12 from being over-discharged. When the process determines as affirmative at step S16, the process outputs an excitation current to the first switch SW1 and the second switch SW2 to close the switches SW1 and SW2 at step S18 and step S20, and terminates the switch control process. Thus, even in a case where a false latch occurs on either the switch SW1 or the switch SW2, the process is able to change the state to be ON state.

When the process determines as negative at step S16, that is, in the case where the minimum cell voltage Vmin is lower than the first threshold Vk1, at step S22 and S24, the process outputs the excitation current to the first switch SW1 and the second switch SW2 to open the switches SW1 and SW2, and terminates the switch control process. Thus, the battery cell 12 can be prevented from being over-discharged. According to the present embodiment, the processes at steps S22 and S24 correspond to switch control unit and first control unit, respectively.

On the other hand, in a state of jump-start in the system stopped state, that is, a state where the power is being supplied by the external power source 26, since the specified voltage VP is larger than the threshold Vth, the process determines as affirmative at step S14. In this case, at subsequent step S26, the process determines whether the minimum cell voltage Vmin acquired at step S12 is larger than the second threshold Vk2. When determined as affirmative at step S26, that is, under a condition where the minimum cell voltage Vmin is larger than the second threshold Vk2, at step S28 and step S29, the process outputs the excitation current to the first switch SW1 and the second switch SW2 to close the switches SW1 and SW2 and terminates the process. Thus, the control unit 30 can be activated by the power supplied from the external power source 26. According to the present embodiment, the process at step S14 corresponds to external power supply determination unit, and processes at steps S28 and S30 correspond to second control unit.

Further, when determined as negative at step S26, at step S32 and step S34, the process outputs the excitation current to the first switch SW1 and the second switch SW2 to open the switches SW1 and SW2, and terminates the switch control process. Thus, the power is supplied to the battery cell 12 in the over-discharging state from the external power source 26, thereby suppressing occurrence of fault.

Figure 3:
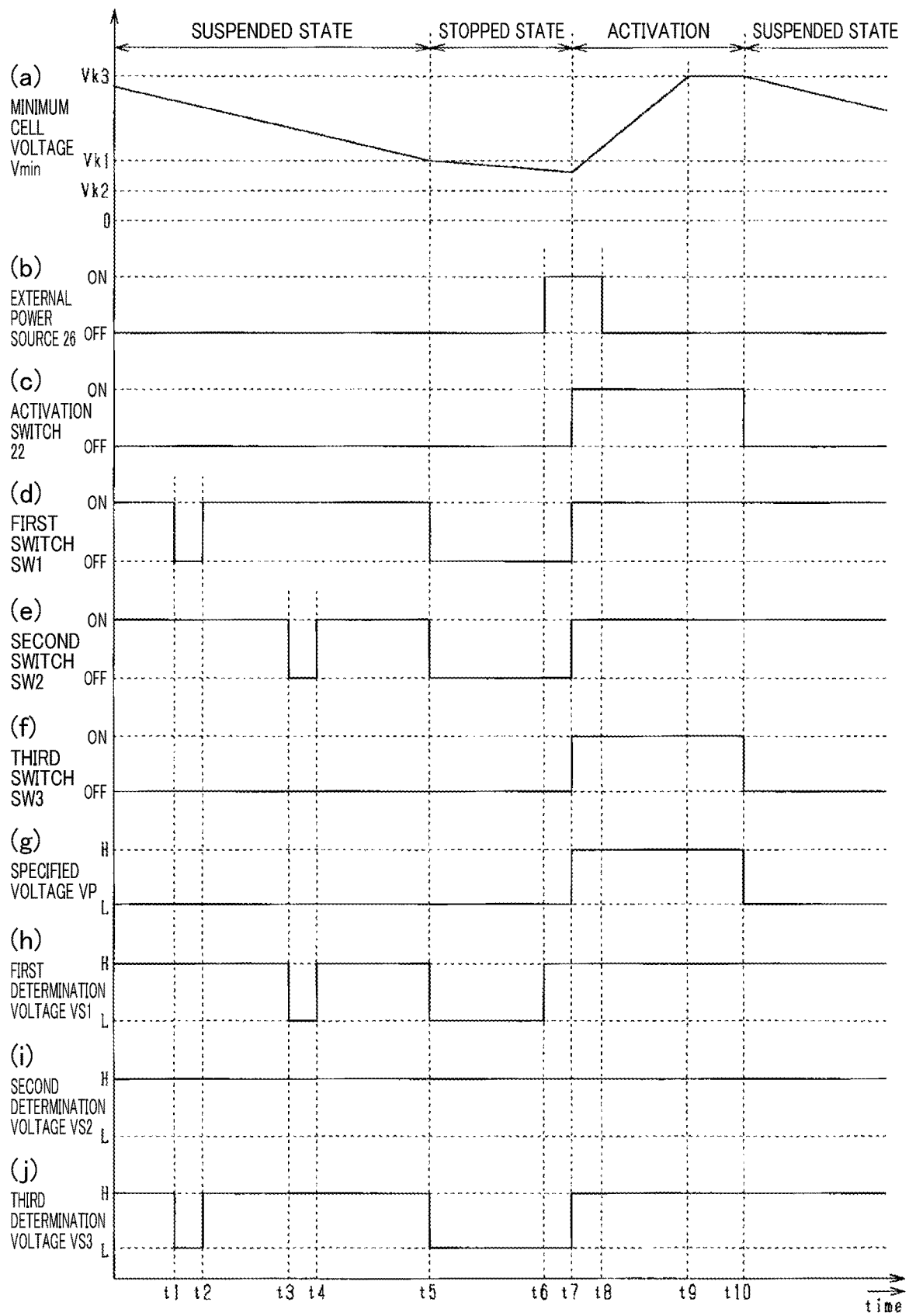
FIG. 3 is a timing diagram showing a change in states of a first switch and a second switch.

FIG. 3 shows an example of a switch control process. FIG. 3 is a change in the states of the first switch SW1 and the second switch SW2 in the system suspended state and the system stopped state. In FIG. 3, (a) shows a change in the minimum cell voltage Vmin, (b) shows a change in the connection state of the external power source 26, and (c) shows a change in a state of the activation switch 22. Moreover, (d) to (f) show changes in the states of the switched SW1 to SW3, (g) shows an estimation value of the specified voltage VP, and (h) to (j) show changes in the determination voltages VS1 to VS3.

In FIG. 3(b), ON state indicates a state where the external power source 26 is connected to the external connection terminal 24, and an OFF state indicates a state where the external power source 26 is not connected to the external connection terminal 24. Further, in FIG. 3 (g) to (j), logical H indicates a state where any one of the specified voltage VP and the determination voltages VS1 to VS3 is larger than the predetermined value Vn, and logical L indicates a state where any one of the specified voltage VP and the determination voltages VS1 to VS3 is smaller than the predetermined value Vn.

As shown in FIG. 3, in the system suspended state, the first switch SW1 and the second switch SW2 are maintained at ON state. In this system suspended state, if a false latch occurs at time t1 on the first switch SW1 due to noise or the like, the third determination voltage VS3 changes to logical L from logical H.

According to the present embodiment, the first switch SW1 and the second switch SW2 are connected in parallel to the control unit 30. Hence, even in a case where a false latch occurs on the first switch SW1 due to noise or the like, a dark current can be supplied to the control unit 30 from the DC power source 10 via the second electrical path L2 and the third electrical path L3. Thus, the DC power source 10 can be continuously monitored also in a period from time t1 to time t2 where a false latch has occurred on the first switch SW1. Then, the switch control process is performed at time t2 at which the intermittent activation period starts, whereby the first switch SW1 is switched to be ON state and the third determination voltage VS3 is changed to logical H.

Thereafter, when a false latch occurs on the second switch SW2 due to noise or the like at time t3, the first determination voltage VS1 is changed to logical L from logical H.

According to the present embodiment, the first switch SW1 and the second switch SW2 are connected in parallel to the control unit 30. Hence, even in a case where a false latch occurs on the second switch SW2 due to noise or the like, a dark current can be supplied to the control unit 30 from the DC power source 10 via the first electrical path L1. Thus, the DC power source 10 can be continuously monitored also in a period from time t3 to time t4 where a false latch has occurred on the second switch SW2. Then, the switch control process is performed at time t4 at which the intermittent activation period starts, whereby the second switch SW2 is switched to the ON state and the first determination voltage VS1 is changed to logical H.

The minimum cell voltage Vmin is decreased by the dark current supplied to the control unit 30 from the DC power source 10 in the system suspended state. Then, when the minimum cell voltage Vmin decreases to be lower than the first threshold Vk1 at time t5, the first switch SW1 and the second switch SW2 are switched to be OFF state and the state is changed to the system stopped state from the system suspended state. Thus, the minimum cell voltage Vmin is prevented from being decreased and the battery cell 12 can be prevented from being over-discharged.

In the case where the first switch SW1 and the second switch SW2 are switched to be OFF state, the first determination voltage VS1 and the third determination voltage VS3 are switched to be logical L. On the other hand, the second determination voltage VS2 is maintained at logical H even when the first switch SW1 and the second switch SW2 are switched to be OFF state.

In the system suspended state, the minimum cell voltage Vmin gradually decreases with a self-discharge of the battery cell 12. In this system suspended state, when the external power source 26 is connected to the external connection terminal 24, the first determination voltage VS1 is switched to be logical H from logical L.

Then, at time t7, when the activation switch 22 is switched to be ON state, the third switch SW3 is switched to be ON state and the control unit 30 receives the operation voltage VOM to activate the vehicle load 20. When the control unit 30 receives the operation voltage VOM, the switch control process is performed, the minimum cell voltage Vmin is acquired and the specified voltage VP is detected.

In the case where the specified voltage VP detected at time t7 is larger than the threshold Vth, since it is in the vehicle activation state using the activation switch 22, the process determines whether the minimum voltage Vmin acquired at time t7 is larger than the second threshold Vk2. Then, as shown in FIG. 3, in the case where the minimum cell voltage Vmin acquired at time t7 is larger than the second threshold Vk2, the first switch SW1 and the second switch SW2 are switched to be ON state. Thus, the third determination voltage VS3 is switched to be logical H from logical L.

When the second switch SW2 is switched to be ON state, the power is supplied to the DC power source 10 from the external power source 26 and the activated vehicle load 20 (i.e. rotary electric machine). Thus, the minimum cell voltage Vmin increases. After activating the vehicle load 20, when the external power source 26 is removed from the external connection terminal 24, the power is supplied to the DC power source 10 from the vehicle load 20.

The respective cell voltages VB1 to VBN are feedback-controlled by the control unit 30, in which an increase in the minimum cell voltage Vmin is prevented when the minimum cell voltage Vmin reaches the third threshold Vk3 at time t9. The third threshold Vk3 refers to a determination threshold for preventing over-charging of the battery cell 12. The minimum cell voltage Vmin is maintained at the third threshold Vk3 in a period from time t9 to time t10 where the power supply from the vehicle load 20 is continued.

When the activation switch 22 is switched to be OFF state at time t10, the specified voltage VP is switched to be logical L. As a result, the third switch SW3 is switched to be OFF state and the state is changed to the system suspended state.

Further, the vehicle load 20 is stopped. Thus, the minimum cell voltage Vmin starts to decrease from the third threshold Vk3.

On the other hand, in the case where the minimum cell voltage Vmin acquired at time t7 is smaller than the second threshold Vk2, the first switch SW1 and the second switch SW2 are maintained at OFF state. Thus, the battery cell 12 in the over-discharged state can be prevented from being supplied with the power.

According to the above-described embodiments, the following effects and advantages can be obtained.

According to the above-described embodiments, the current is supplied to the control unit 30 from the DC power source 10 though two paths of the first electrical path L1 including the first switch SW1 and the second electrical path L2 including the second switch SW2. Hence, even in the case where a false latch occurs on the first switch SW1 due to noise or the like, the DC power source 10 can be continuously monitored without stopping the current supply to the control unit 30. Moreover, although a path-fault occurs on either one path in the two paths, the DC power source 10 can be continuously monitored. Thus, reliability for avoiding the over-discharging of the DC power source can be improved.

According to the present embodiment, for example, in the case where the voltage of the DC power source 10 drops because the vehicle is left parked for a long term period, the control unit 30 switches the first switch SW1 and the second switch SW2 to be OFF states. Thus, even when a redundant configuration of the first switch in the control unit 30 side is adopted, over-discharging of the DC power source 19 can be appropriately prevented.

Specifically, according to the configuration of the power source system 100 of the present embodiment, the second switch SW2 disposed on the second electrical path L2 extending to the vehicle load 20 is used, thereby achieving the redundant configuration of the first switch SW1 in the control unit 30 side. The second switch SW2 has a larger current amount than the first switch SW1 since the second switch SW2 is required to flow current into the vehicle load 20. Hence, the second switch is used to supply current to the control unit 30. According to the present embodiment, since the redundant configuration of the first switch SW1 is achieved using the second switch SW2, complexity of the power source system 100 can be avoided compared to a case where a plurality of first switches SW1 are provided and connected in parallel to have a parallel structure. Therefore, downsizing and cost reduction can be achieved for the power source system 100.

According to a configuration in which the third electrical path L3 is provided to connect the first connection point P1 of the first electrical path L1 and the second connection point P2 of the second electrical path L2, when attempting to stop the power supply to the DC power source 10 from the vehicle load 20 by switching the second switch SW2 to be OFF state, if the first switch SW1 is ON state, the DC power source 10 is accidentally charged from the vehicle load 20 via the third electrical path L3. Hence, the charging state of the DC power source 10 cannot be appropriately controlled. According to the present embodiment, since the first diode DR1 is disposed on the first electrical path L1, the DC power source 10 can be appropriately prevented from being accidentally charged from the vehicle load 20 via the third electrical path L3.

Further, according to a configuration in which the third electrical path L3 is provided, for example, when the second switch SW2 is switched to the OFF state, attempting to cutoff a leakage current flowing to the vehicle load 20 from the DC power source 10, if the first switch SW1 is in the ON state, the third electrical path L3 causes the current to leak from the DC power source 10 to the vehicle load 20 and the power is unnecessarily consumed from the DC power source 10. According to the present embodiment, since the second diode DR2 is provided on the third electrical path L3, the current leakage can be prevented from flowing from the DC power source 10 to the vehicle load 20 via the third electrical path L3. Hence, unnecessary power consumption at the DC power source 10 can be avoided.

In the case where the first switch SW1 and the second switch SW2 are switched to be OFF states in response to a decrease in the minimum cell voltage Vmin of the DC power source 10, the jump-start may be performed. According to the present embodiment, in a state where the first switch SW1 and the second switch SW2 are in OFF states, the first switch SW1 and the second switch SW2 are switched to be closed states under a condition where the minimum cell voltage Vmin of the DC power source 10 is larger than the second threshold Vk2 which is smaller than the first threshold Vk1. Thus, the control unit 30 can be restarted by a power supply from the external power source 26 under a condition where an excessive voltage drop (with which recovery is significantly difficult) in the DC power source 10 does not occur Accordingly, an appropriate jump-start can be performed after the voltage-drop in the DC power source 10 occurred.

Second Embodiment

Hereinafter, for a second embodiment, difference from the first embodiment will mainly be described with reference to FIGS. 4 and 5. According to the present embodiment, the switch control process differs from that of the first embodiment.

Figure 4:
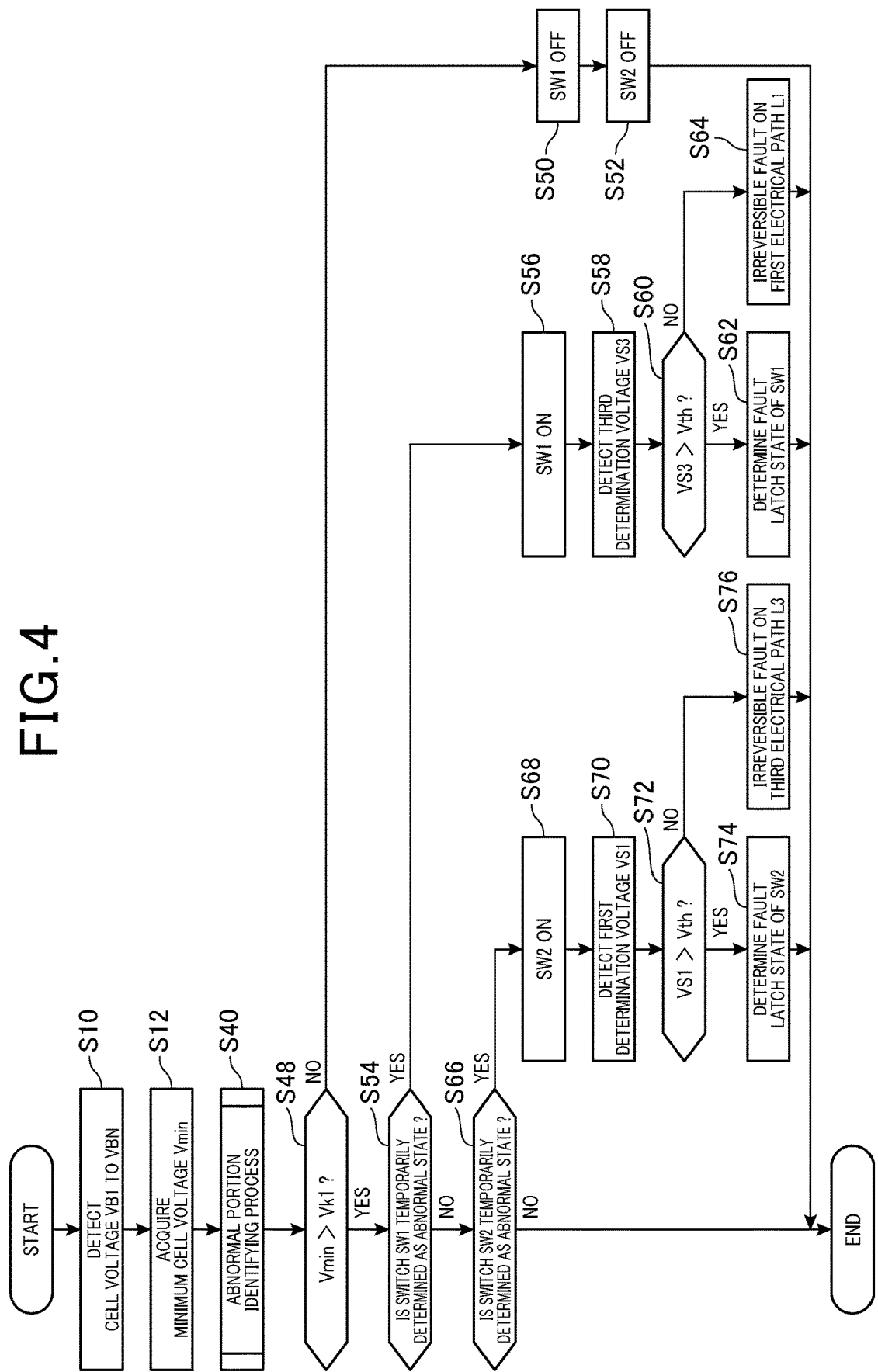
FIG. 4 is a flowchart showing a switch control process according to a second embodiment.

FIG. 4 is a flowchart showing a switch control process according to the present embodiment. In FIG. 4, for the processes same as those shown in FIG. 2, the same step numbers are applied and explanation thereof will be omitted. According to the present embodiment, the switch control process corresponds to opening/closing control of the first switch and second switch.

As shown in FIG. 4, in the switch control process of the present embodiment, when acquiring the minimum cell voltage Vmin at step S12, the process executes an abnormal portion identifying process at step S40.

Figure 5:
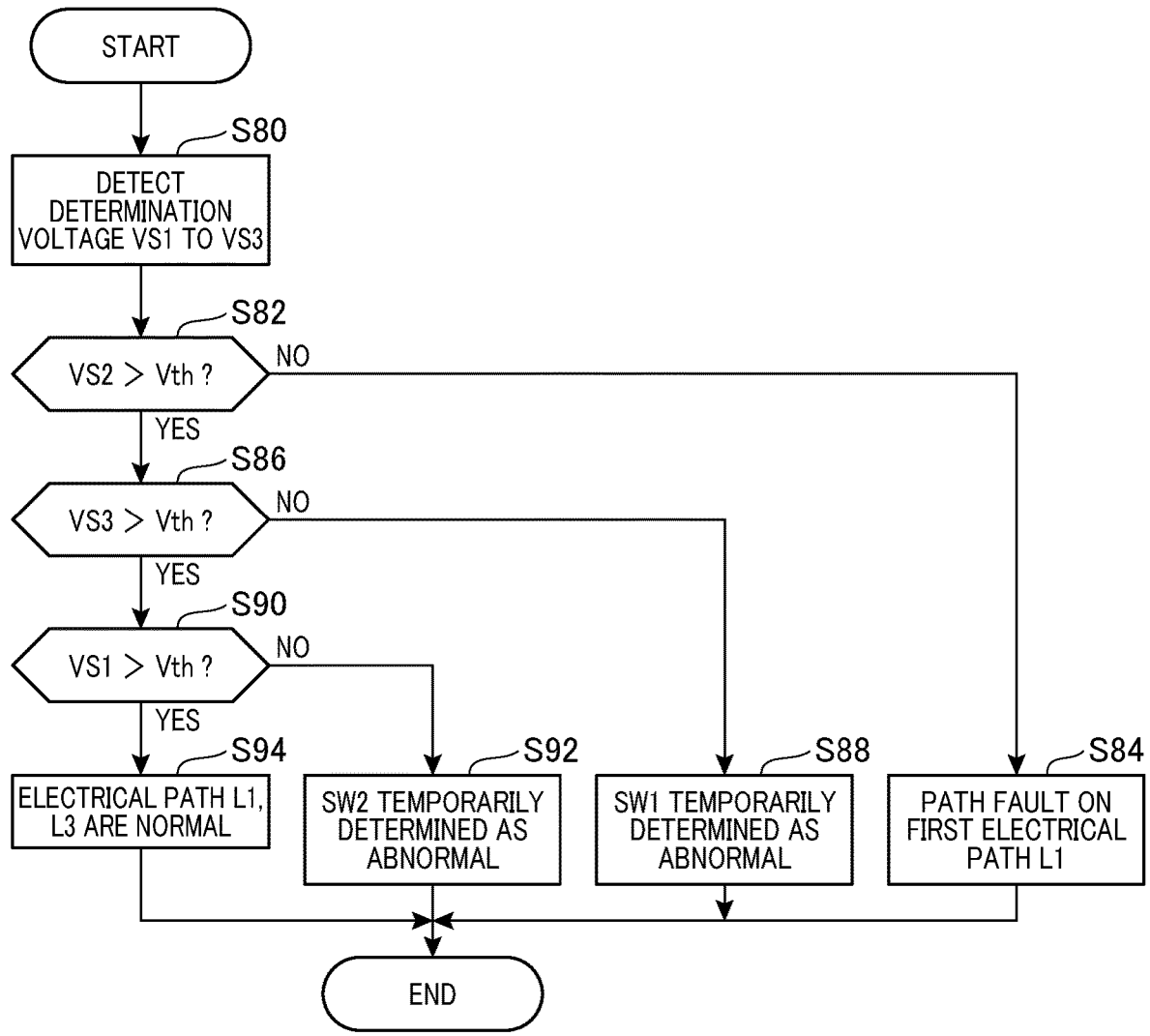
FIG. 5 is a flowchart showing an abnormal portion identifying process.

FIG. 5 shows a flowchart showing an abnormal portion identifying process. When starting the abnormal portion identifying process, the process detects the determination voltages VS1 to VS3 at step S80. At step S82, the process determines whether the second determination voltage VS2 detected at step S80 is larger than the threshold Vth. In the case where the determination at step S82 is negative, the process determines that a path-fault has occurred on the first electrical path L1, and terminates the abnormal portion identifying process. The path-fault refers to a fault in which the power source voltage VDD is disconnected from the first switch SW1, for example, a breakage of the first electrical path L1. Note that the path-fault corresponds to cutoff fault and processes at steps S82 and S84 correspond to third fault determination unit according to the present embodiment.

When the determination at step S82 is affirmative, the process determines, at step S86, whether the third determination voltage VS3 detected at step S80 is larger than the threshold Vth. When the determination result at step S86 is negative, the process temporarily determines, at step S88, that the first switch SW1 is in an abnormal opened state, and terminates the abnormal portion identifying process. The abnormal opened state refers to a fault in which the first switch SW1 is OFF state even when the control unit 30 controls the first switch SW1 to be ON state. Note that the processes at steps S86 and S88 correspond to a first fault determination unit.

When the determination result at step S86 is affirmative, the process determines, at step S90, whether the first determination voltage VS1 detected at step S80 is larger than the threshold Vth. When the determination result at step S90 is negative, the process temporarily determines, at step S92, that the second switch SW2 is in an abnormal opened state, and terminates the abnormal portion identifying process. Note that the processes at steps S90 and S92 correspond to a second fault determination unit.

On the other hand, when the determination result at step S90 is affirmative, the process determines, at step S92, that the electrical paths L1 and L3 are normal, and terminates the abnormal portion identifying process.

When terminating the abnormal portion identifying process, as shown in FIG. 4, the process determines, at step S12, whether the minimum cell voltage Vmin acquired at step S12 is larger than the first threshold Vk1. In the case where the determination result at step S48 is negative, the process outputs, at steps S50 and S52, excitation current to the first switch SW1 and the second switch SW2 to open the switches SW1 and SW2, and terminates the switch control process.

On the other hand, if the determination result at step S48 is affirmative, the process determines, at step S54, whether the first switch SW1 is temporarily determined as being in an abnormal opened state in the abnormal portion identifying process. When the determination result at step S54 is affirmative, the process determines, at steps S56 to S64, whether the abnormal opened state of the first switch SW1 is caused by a false latch.

Specifically, the process outputs, at step S56, the excitation current to the first switch SW1 to close the first switch SW1. In other words, the process outputs the excitation current to the first switch SW1 to close the first switch SW1 under a state where the first switch SW1 is temporarily determined as an abnormal opened state in the abnormal portion identifying process. Next at step S58, the process detects the third determination voltage VS3. At step S60, the process determines whether the third determination voltage VS3 detected at step S58 is larger than the third determination voltage VS3.

When the determination result at step S60 is affirmative, that is, the process at step S56 cancels the abnormal opened state of the first switch SW1, the process determines, at step S62, that the first switch SW1 is in a false latch state, and terminates the switch control process. On the other hand, when determined as negative at step S60, that is, the abnormal opened state of the first switch SW1 is not cancelled by the process at step S56, the process determines that an irreversible fault has occurred on the first electrical path L1 at step S64, and terminates the switch control process. The irreversible fault refers to an open fault of the first switch SW1 or a breakage of the first electrical path L1 in the vicinity of the first switch SW1.

On the other hand, when determined as negative at step S54, the process determines, at step S66, whether the second switch SW2 is temporarily determined as an abnormal opened state in the abnormal portion identifying process. When the determination result at step S66 is affirmative, the process determines, at steps S68 to S76, whether the abnormal opened state of the second switch SW2 is caused by a false latch. Specifically, the process switches, at step S68, the state of the second switch SW2 to be the ON state. In other words, the process outputs the excitation current to the second switch SW2 to close the second switch SW2 under a condition in which the second switch SW2 is temporarily determined as an abnormal opened state in the abnormal portion identifying process. Subsequently, at step S70, the process detects the first determination voltage VS1. At step S72, the process determines whether the first determination voltage VS1 detected at step S70 is larger than the threshold Vth.

When the determination result at step S72 is affirmative, that is, the process at step S68 cancels the abnormal opened state of the second switch SW2, the process determines, at step S74, the second switch SW2 is in a false latch state, and terminates the switch control process.

On the other hand, when determined as negative at step S74, that is, the abnormal opened state of the second switch SW2 is not cancelled by the process at step S68, the process determines that an irreversible fault has occurred on the third electrical path L3 at step S76, and terminates the switch control process.

When the determination result at step S66 is negative, the process terminates the switch control process without changing the states of the switch SW1 and the switch SW2. The states of the switch SW1 and the switch SW2 are not changed, when determined that the electrical paths L1 and L3 are normal in the abnormal portion identifying process or when determined that a path-fault occurs on the first electrical path L1. In other words, when determined that a path-fault has occurred on the first electrical path L1 in the abnormal portion identifying process, the excitation current for closing switches is not outputted to the respective switches SW1 and SW2.

According to the above-described embodiments, in the system suspended state of the power source system 100, the dark current is supplied to the control unit 30 via the first switch SW1 and the second switch SW2 and the opened/closed states of the first switch SW1 and the second switch SW2 are controlled depending on the charging state of the DC power source 10. In the system suspended state, detecting a voltage (VS3) in the anti DC power source side between both end voltages of the first switch SW1 or a voltage (VS1) in the anti DC power source side between both end voltages of the second switch SW2, the first switch SW and the second switch SW2 can be determined that they are in the states of abnormally opened due to noise or the like. Further, since the excitation current is outputted to close the respective switches SW1 and SW2 under a state where these switches SW1 and SW2 are determined as abnormally opened states, the excitation current can be prevented from flowing wastefully to the respective switches SW1 and SW2. Thus, unnecessary power consumption in the system suspended state can be avoided.

According to the present embodiment, in the case where a path-fault has occurred on the first electrical path L1, even if the excitation current is outputted to the first switch SW1 in order to close the first switch SW1, power supply via the first switch SW1 is not re-started. According to the present embodiment, when determined that a path-fault has occurred on the first electrical path L1, since the excitation current for closing switches is not supplied to the respective switches SW1 and SW2, the excitation current can be prevented from flowing wastefully to the first switch SW1. Thus, also unnecessary power consumption in the system suspended state can be avoided.

Third Embodiment

Figure 6:
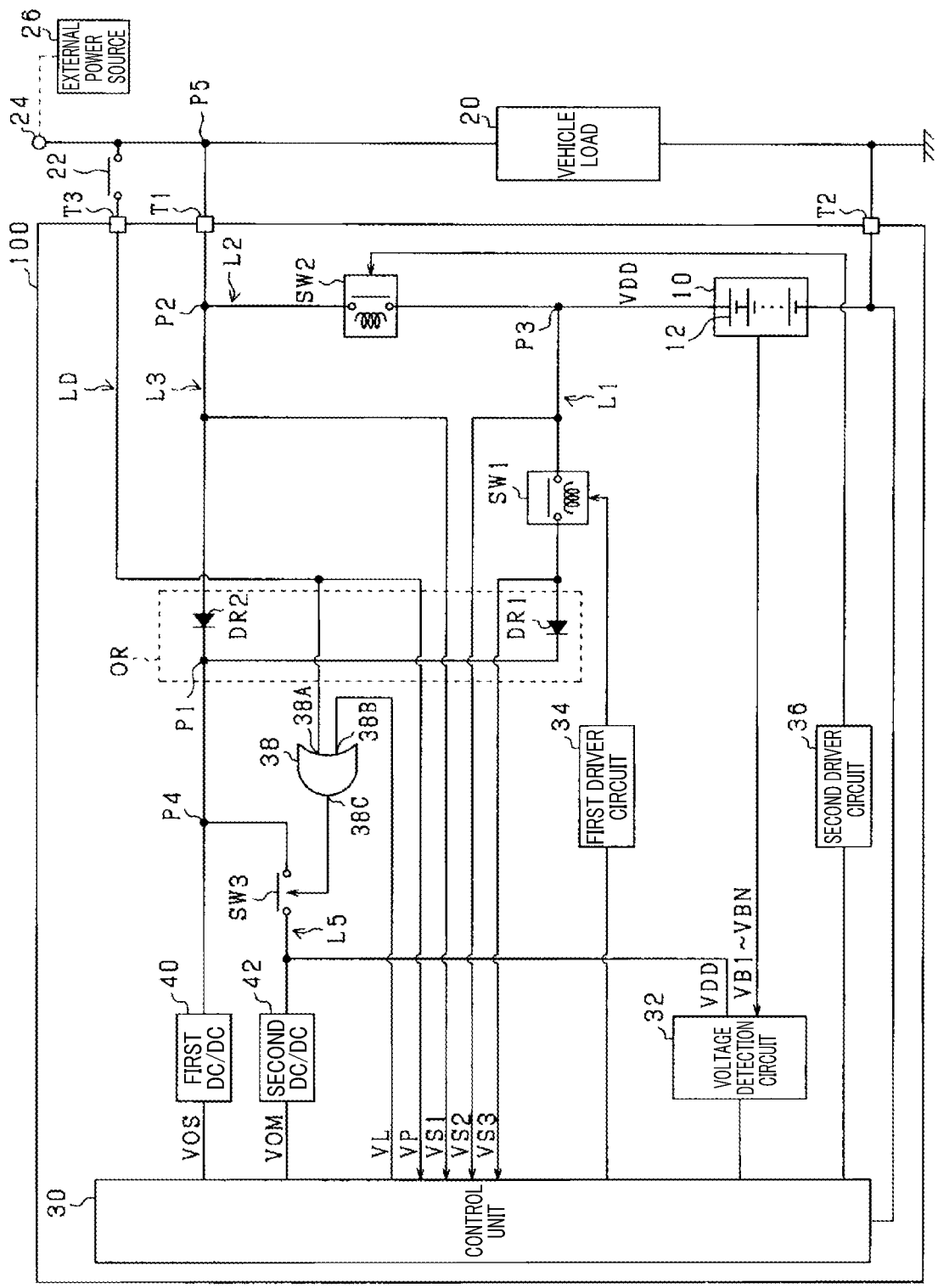
FIG. 6 is a block diagram showing an overall configuration of a power source system according to a third embodiment.

Hereinafter, for a third embodiment, difference from the first embodiment will mainly be described with reference to FIG. 6. The present embodiment differs from the first embodiment in that the first connection point P1 is not connected to the third terminal T3.

Specifically, a fourth electrical path L4 which connects between the external connection terminal 24 and the first connection point P1 is not provided. According to the present embodiment, in a jump-start state of the system stopped state, the power is supplied to the control unit 30 from the external power source 27 via the third electrical path L3 only.

According to the present embodiment, instead of the fourth electrical path L4, a signal path LD is provided. The signal path LD allows the voltage signal indicating the voltage value of the specified voltage VP as a voltage at the external connection terminal 24 to be transmitted therethrough. The signal path LD is provided between the external connection terminal 24 and the control unit 30. Specifically, the signal path LD connects between the external connection terminal 24 and the control unit 30 via the third terminal T3 and the activation switch 22 is disposed on the signal path LD. According to the present embodiment, the voltage signal corresponds to activation signal.

The first input terminal 38A of the logical OR circuit 38 is connected to a portion between the third terminal T3 and the control unit 30 on the signal path LD. The logical OR circuit 38 receives a voltage signal of the specified voltage VP via the signal path LD. The control unit 30 determines, in the system stopped state of the power source system 100, the jump-start, that is, a power-supplied state by the external power source 26, based on the voltage signal.

According to the above-described embodiments, by using the third electrical path L3 provided for achieving a redundant configuration of first switch SW1 in the control unit 30 side, the power can be supplied to the control unit 30 from the external power source 26 in the jump-start. Hence, the fourth electrical path L4 as an electrical path for supplying power to the control unit 30 from the external power source 26 is not necessarily provided other than the third electrical path L3. Hence, the configuration of the power source system 100 can be simplified.

According to the present embodiment, instead of the fourth electrical path L4, a signal path LD is provided. The signal path LD serves as a path for transmitting the voltage signal. Hence, the signal path LD can be formed thinner than the fourth electrical path L4 for supplying power (current). Further, for the signal path LD, the third diode DR3 for restricting the current direction is not required. Thus, the configuration of the power source system 100 can be simplified.

Other Embodiment

The above-described embodiments can be modified in the following manners.

The power source system 100 is not limited to be mounted on a hybrid vehicles, but may be mounted on vehicles having internal combustion engines.

As rectifier elements, diodes may be used, or other rectifiers may be used.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

(Conclusion)

The present disclosure is to provide a power source system capable of continuously monitoring the storage battery and suppressing complexity of the configuration of the power source system.

A first aspect of the present disclosure is a power source system including:

a storage battery;

a control unit operating by being supplied with power from the storage battery and monitoring the storage battery;

a first switch configured as a latch type switch disposed on a first electrical path between the storage battery and the control unit; and a second switch configured as a latch type switch disposed on a second electrical path between the storage battery and an electrical equipment as an object to which the storage battery supplies power, in which the first switch and the second switch are connected in parallel to the control unit; current is supplied to the control unit from the storage battery in a state where the first switch and the second switch are closed; and the control unit includes a switch control unit configured to stop current supply to the control unit from the storage battery by changing the first switch and the second switch to be opened.

According to a power source system, generally, current is supplied to the control unit from the storage battery through the first electrical path including the first switch, and current is supplied to the electrical equipment from the storage battery through the second electrical path including the second switch.

In this aspect, the two electrical paths are utilized to supply current to the control unit from the storage battery. Hence, even when the first switch is accidentally switched to be an opened state due to noise or the like, current supply to the control unit is not stopped and the storage battery can be continuously monitored. Further, in the case where the voltage of the storage battery drops because the vehicle is left parked for a long time for example, the switch control unit of the control unit switches the first switch and the second switch to be opened states to stop the current supply to the control unit from the storage battery. Thus, the storage battery can be prevented from being over-discharged. According to the above-described configurations, since the second switch disposed on the second electrical path to the electrical equipment is utilized to accomplish a redundant configuration of the first switch in the control unit side, the configuration of the power source system can be prevented from becoming more complex.

According to the second aspect, a first connection point between the first switch and the control unit on the first electrical path is connected to a second connection point between the second switch and the electrical equipment on the second electrical path, whereby the first switch and the second switch are connected in parallel to the control unit. The power source system includes: a first rectifying element disposed between the first switch and the first connection point on the first electrical path, such that a forward direction thereof is a direction towards the first connection point from the first switch; and a second rectifying element disposed on a third electrical path between the first connection point and the second connection point, such that a forward direction thereof is a direction towards the first connection point from the second connection point.

According to a configuration in which the third electrical path is provided, for example, when attempting to stop the power supply to the storage battery from the electrical equipment by switching the second switch to the opened state, if the first switch is closed state, the storage battery is accidentally charged from the electrical equipment via the third electrical path. Hence, the charging state of the storage battery cannot be appropriately controlled. According to this aspect, since the first diode is disposed on the first electrical path, the storage battery can be appropriately prevented from being accidentally charged from the electrical equipment via the third electrical path.

Further, according to a configuration in which the third electrical path is provided, for example, when the second switch is switched to the opened state, attempting to cutoff a leakage current flowing to the electrical equipment from the storage battery, if the first switch is the closed state, the third electrical path causes the current to leak from the storage battery to the electrical equipment and the power is unnecessarily consumed from the storage battery. According to this aspect, since the second diode is provided on the third electrical path, the current leakage can be prevented from flowing from the storage battery to the electrical equipment via the third electrical path. Hence, unnecessary power consumption at the storage battery can be avoided.

A third aspect is a power source system, in which the power source system is configured to activate the control unit at a predetermined period in a system suspended state and perform, when activating the control unit, an opening/closing control for the first switch and the second switch by the switch control unit. The control unit includes: a first fault determination unit that determines a state where the first switch is in an abnormal opened state based on a voltage in an anti-storage battery side between both end voltages of the first switch; and a second fault determination unit that determines a state where the second switch is in an abnormal opened state based on a voltage in an anti-storage battery side between both end voltages of the second switch. The switch control unit is configured to output a latch command signal to the first switch for closing the first switch under a state where the first fault determination unit determines the abnormal opened state of the first switch; the switch control unit is configured to output a latch command signal to the second switch for closing the second switch under a state where the second fault determination unit determines the abnormal opened state of the second switch.

In the system suspended state of the power source system, the dark current is supplied to the control unit via the first switch and the second switch and the opened/closed states of the first switch and the second switch are controlled depending on the charging state of the storage battery. In the system suspended state, detecting a voltage in the anti storage battery side between both end voltages of the first switch or a voltage in the anti storage battery side between both end voltages of the second switch, the first switch and the second switch can be determined as being in the abnormally opened states due to noise or the like. Further, since the latch command signal is outputted to close the respective switches under a state where these switches are determined as abnormally opened states, the latch command signal can be prevented from flowing wastefully to the respective switches. Thus, unnecessary power consumption in the system suspended state can be avoided.

According to a fourth aspect, the control unit further includes a third fault determination unit that determines, based on a voltage in the anti-storage battery side between both end voltages of the first switch, that a cutoff fault occurs on the first electrical path; and the switch control unit is configured not to output a latch command signal to each switch in the opening/closing control during the system suspended state, in the case where the third fault determination unit determines that a cutoff fault occurs on the first electrical path.

In the case where a path-fault has occurred on the first electrical path, even if the latch command signal is outputted to the first switch in order to close the first switch, power supply via the first switch is not re-started. Here, when determined that a path-fault has occurred on the first electrical path, since the latch command signal for closing switches is not supplied to the respective switches, the latch command signal can be prevented from flowing wastefully to the first switch. Thus, also unnecessary power consumption in the system suspended state can be avoided.

According to a fifth aspect, the control unit is configured to be capable of being activated in the case where the first switch and the second switch are opened states, by a power supplied from an external power source connected to an external connection terminal. The control unit includes: a voltage acquiring unit that acquires a battery voltage of the storage battery; and an external power supply determination unit that determines a power supplied state where power is supplied by the external power source. The switch control unit includes: a first control unit that changes the first switch and the second switch to be opened states in the case where the battery voltage is lower than a first threshold; a second control unit that changes the first switch and the second switch to closed states under a state where the battery voltage of the storage battery is higher than a second threshold which is lower than the first threshold, in the case where the first control unit changes the first switch and the second switch to opened states and the power supplied state by the external power source is determined.

In the case where the first switch and the second switch are switched to opened states in response to a decrease in the voltage of the storage battery, an activation of the control unit by the external power source (i.e. jump-start) may be performed. In this case, in a state where the first switch and the second switch are in opened states, the first switch and the second switch are switched to closed states under a condition where the battery voltage of the storage battery is larger than the second threshold. Thus, the control unit can be restarted by a power supply from the external power source under a condition where an excessive voltage drop (with which recovery is significantly difficult) in the storage battery has not occurred. Accordingly, an appropriate jump-start can be performed after the voltage-drop in the storage battery occurred.

According to a sixth aspect, a first connection point between the first switch and the control unit on the first electrical path is connected to a second connection point between the second switch and the electrical equipment on the second electrical path, whereby the first switch and the second switch are connected in parallel to the control unit; and the control unit is connected to the external connection terminal via a third electrical path between the first connection point and the second connection point.

Since the control unit is connected to the external connection terminal via the third electrical path, by using the third electrical path provided for achieving a redundant configuration of the first switch in the control unit side, the power can be supplied to the control unit from the external power source in the jump-start. Hence, an electrical path other than the third electrical path for supplying power to the control unit from the external power source is not necessarily provided. Hence, the configuration of the power source system 100 can be simplified.

According to a seventh aspect, an activation switch of the control unit is provided on a signal path between the control unit and the external connection terminal; and the external power supply determination unit is configured to determine, based on an activation signal transmitted via the signal path, the power supplied state where power is supplied by the external power source.

The external power supply determination unit receives an activation signal transmitted via the signal path. Since the signal path serves a path for transmitting the activation signal, the signal path can be thinner than an electrical path for supplying power (current). For the signal path, a rectifying element for restricting the current direction is not required. Thus, the configuration of the power source system can be simplified.

What is claimed is:

1. A power source system comprising:
   a storage battery;
   a control unit operating by being supplied with power from the storage battery and monitoring the storage battery;
   a first switch configured as a latch type switch disposed on a first electrical path between the storage battery and the control unit; and
   a second switch configured as a latch type switch disposed on a second electrical path between the storage battery and an electrical equipment as an object to which the storage battery supplies power,
   wherein
   the first switch and the second switch are connected in parallel to the control unit;
   current is supplied to the control unit from the storage battery in a state where the first switch and the second switch are closed; and
   the control unit includes a switch control unit configured to stop a current supply to the control unit from the storage battery by changing the first switch and the second switch to be opened.

2. The power source system according to claim 1, wherein
   a first connection point between the first switch and the control unit on the first electrical path is connected to a second connection point between the second switch and the electrical equipment on the second electrical path, whereby the first switch and the second switch are connected in parallel to the control unit;
   a first rectifying element disposed between the first switch and the first connection point on the first electrical path, such that a forward direction thereof is a direction towards the first connection point from the first switch; and
   a second rectifying element disposed on a third electrical path between the first connection point and the second connection point, such that a forward direction thereof is a direction towards the first connection point from the second connection point.

3. The power source system according to claim 1, wherein
   the power source system is configured to activate the control unit at a predetermined period in a system suspended state and perform, when activating the control unit, an opening/closing control for the first switch and the second switch by the switch control unit;

the control unit comprises:
a first fault determination unit that determines a state where the first switch is in an abnormal opened state based on a voltage in an anti-storage battery side between both end voltages of the first switch; and
a second fault determination unit that determines a state where the second switch is in an abnormal opened state based on a voltage in an anti-storage battery side between both end voltages of the second switch;
the switch control unit is configured to output a latch command signal to the first switch for closing the first switch under a state where the first fault determination unit determines the abnormal opened state of the first switch; and
the switch control unit is configured to output a latch command signal to the second switch for closing the second switch under a state where the second fault determination unit determines the abnormal opened state of the second switch.

4. The power source system according to claim 3, wherein
the control unit further comprises a third fault determination unit that determines, based on a voltage in the anti-storage battery side between both end voltages of the first switch, that a cutoff fault occurs on the first electrical path; and
the switch control unit is configured not to output a latch command signal to each switch in the opening/closing control during the system suspended state, in the case where the third fault determination unit determines that a cutoff fault occurs on the first electrical path.

5. The power source system according to claim 1, wherein
the control unit is configured to be capable of being activated in the case where the first switch and the second switch are opened states, by a power supplied from an external power source connected to an external connection terminal;
the control unit comprises:
a voltage acquiring unit that acquires a battery voltage of the storage battery; and
an external power supply determination unit that determines a power supplied state where power is supplied by the external power source;
the switch control unit comprises:
a first control unit that changes the first switch and the second switch to be opened states in the case where the battery voltage is lower than a first threshold;
a second control unit that changes the first switch and the second switch to be closed states under a state where the battery voltage of the storage battery is higher than a second threshold which is lower than the first threshold, in the case where the first control unit changes the first switch and the second switch to be opened states and the power supplied state by the external power source is determined.

6. The power source system according to claim 5, wherein
a first connection point between the first switch and the control unit on the first electrical path is connected to a second connection point between the second switch and the electrical equipment on the second electrical path, whereby the first switch and the second switch are connected in parallel to the control unit; and
the control unit is connected to the external connection terminal via a third electrical path between the first connection point and the second connection point.

7. The power source system according to claim 6, wherein
an activation switch of the control unit is provided on a signal path between the control unit and the external connection terminal; and
the external power supply determination unit is configured to determine, based on an activation signal transmitted via the signal path, the power supplied state where power is supplied by the external power source.

* * * * *